Jan. 9, 1923.

L. I. HEINTZ.
AUTOMOBILE BODY.
FILED APR. 21, 1922.

INVENTOR.
BY
ATTORNEY

Patented Jan. 9, 1923.

1,441,854

UNITED STATES PATENT OFFICE.

LEO I. HEINTZ, OF PHILADELPHIA, PENNSYLVANIA, ASSIGNOR TO HEINTZ MANUFACTURING COMPANY, OF PHILADELPHIA, PENNSYLVANIA, A CORPORATION OF PENNSYLVANIA.

AUTOMOBILE BODY.

Application filed April 21, 1922. Serial No. 555,804.

*To all whom it may concern:*

Be it known that I, LEO I. HEINTZ, a citizen of the United States, residing in the city and county of Philadelphia and State of Pennsylvania, have invented certain new and useful Improvements in Automobile Bodies, of which the following is a specification.

This invention relates to automobile bodies, and more particularly relates to the automobile body frame to which the body panels or shell are applied, and to the doors.

Heretofore in automobile body construction the body frames, to which the body panels or body shell, usually metallic, are attached, have been either entirely of steel or entirely of wood. One of the objections to bodies built entirely of metal is that the closing of the doors produces a disagreeable metallic sound, while another objection to this type of body is the excessive weight required to give sufficient strength to the construction. Also this type of bodies necessitates enormous equipment charges in connection with the manufacture of all the parts in metal. The metal posts are less strong weight-for-weight than posts made of wood, but in automobile bodies having frames constructed entirely of wood the wooden sills are very much more bulky and heavier for structural reasons than metal sills having the same strength. The all-metal type of bodies does not permit of the attachment of the body panels or body shell by means of screws or nails, which, as well known, constitute the best means for attaching the body panels, upholstery, etc. to the frame. The wooden type of frame requires the use of glue for joining the parts together and on this account it is impossible to use high temperature baking enamel without the danger of weakening joints of the structure.

The aim of my invention is to overcome the aforementioned objectionable features present in automobile bodies as now constructed. Another object of my invention is to provide a frame for an automobile body, which may be constructed partly of wood and partly of metal, and to retain the wood where it is most desirable and serviceable, and to retain the metal where it is most desirable and serviceable, all without impairing or forfeiting any structural advantages or other benefits present in either the all-metal or in the all-wood type of frames. Another object of my invention is to provide an automobile body which has a frame partly of metal and partly of wood and which can be put together without the use of glue, thus permitting the use of high temperature baking enamel without the danger of weakening the joints of the structure. Another object of my invention is to provide an automobile body having a frame which is light and strong in construction, and one which may be manufactured inexpensively and with a minimum amount of equipment charges being necessary to produce the parts. Another object of my invention is to provide an automobile body having a frame constructed partly of metal and partly of wood and to which the body panels can be attached by means of screws and nails. Another object of my invention is to provide an automobile body so designed that it can be manufactured in separate uniform parts, such as the main side sills with their post sockets, the posts, the seat units, the cross members, etc., all of which can be assembled later, if desired, thus lessening the cost of quantity production and assembling. Another object of my invention is to provide an automobile body having an integral metal sill member which at the same time provides an outside body panel portion under the doorways, thereby reducing the number of separate parts necessary for the construction. A further object of my invention is to provide a door for automobile bodies, and one which is light and strong in construction, one which may be constructed without the use of glue, and one which is noiseless when being closed and does not require muffling to avoid the production of a metallic sound. Other objects will be in part obvious and in part pointed out hereinafter.

In accordance with my invention, I build up my body frame of metallic portions forming side sills, sockets for posts and wooden posts adjacent the doorways or wherever desired. My frame also includes cross members which are preferably of steel, though wooden cross members will serve, and seat supports, preferably of light sheet metal, but also may be suitably constructed of wood. This frame permits of the body panels or shell, usually of sheet metal, to be applied to the frame by means of screws or nails entering the wooden posts. In this construction I fashion the metal sill in such a way that its outer surface serves as body panel portions under the doorways. In combination with the above body construction, I preferably provide a door, the hinges of which may be secured to an adjacent wooden post of the frame.

In order to obtain a light and sturdy door which will be noiseless upon being closed, I construct the frame of the door of wooden frame pieces, preferably secured together at the corners by sheet metal corner boxes, the frame pieces being preferably tapered and being wedged and locked into suitably arranged sockets in the corner boxes. The door is finished by attaching a sheet metal outer panel to this frame. The wooden frame members afford convenient means for attaching upholstery or an inner finishing piece to the door by means of screws or nails. The door hinges and other mechanism may also be readily and securely attached to the wooden frame members, if desired. I also contemplate in accordance with my invention to construct the body of separate uniform parts, which can be made separately in quantities and are adapted to be ready for assembling into a body without requiring further machining or finishing. Such parts may include the side sills either with post sockets integral or with attachable post sockets; the posts; the seat units; the cross members; the body panels; and the doors, either assembled or not, as desired.

The invention accordingly consists in the features of construction, combinations of elements and arrangement of parts which will be exemplified in the construction hereinafter set forth and the scope of the application of which will be indicated in the following claims.

In the accompanying drawings, wherein is shown certain possible embodiments of this invention: Fig. 10 is a vertical section through the side sills of the body frame showing a cross member and the method of connecting the cross member to the side sills; Fig. 11 is a sectional view taken on the line 11—11 of Fig. 10; Figs. 12 to 20 inclusive are sectional views illustrating modified methods of attaching a cross member to a side sill, Fig. 13 being taken on the line 13—13 of Fig. 12, Fig. 15 being taken on the line 15—15 of Fig. 14, Fig. 17 being taken on the line 17—17 of Fig. 16, and Fig. 20 being taken on the line 20—20 of Fig. 19; Figs. 21, 22, 23 and 24 are sectional views showing the method of connecting a side sill, a cross member and a post, Fig. 22 being taken on the line 22—22 of Fig. 21, and Fig. 24 being taken on the line 24—24 of Fig. 23.

Similar reference characters refer to similar parts throughout the several views of the drawings.

Figure 1:
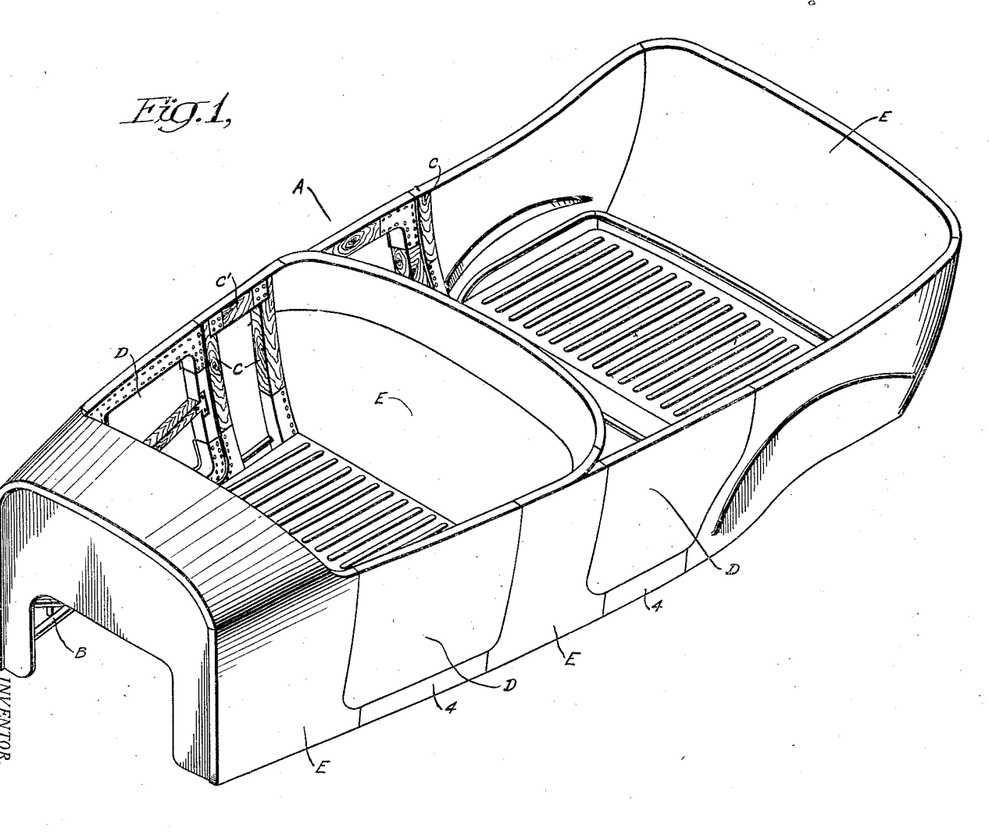
—Fig. 1 is a perspective view of an automobile body embodying my invention.
Figure 2:
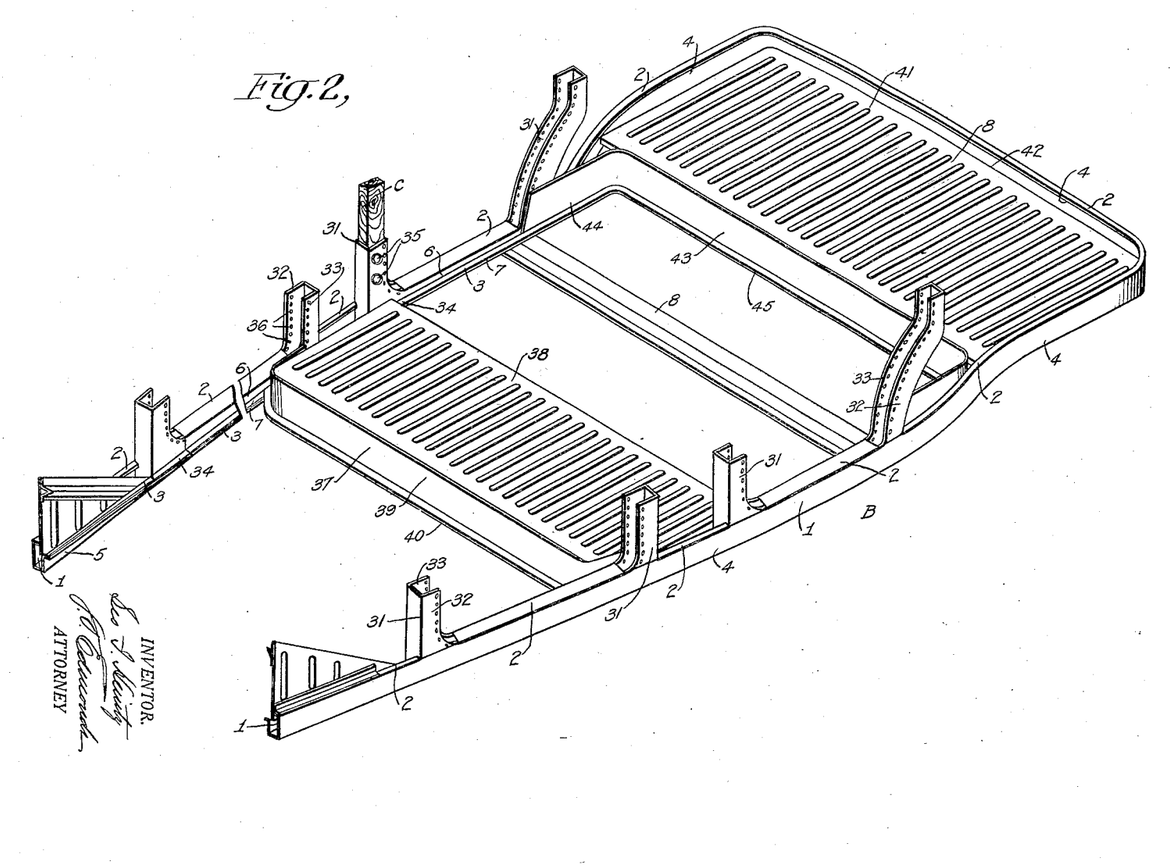
Fig. 2 is a perspective view of a body frame embodying my invention.

Referring to the drawings, the completed body A (shown in Fig. 1) is constructed by combining a body frame portion B (Fig. 2) with the necessary pillars or posts C, doors D, body panels E, and such other parts as it may be desired to include in the body.

Figures 10, 11, 12, 13, 14, 15, 16, 17, 18, 19, 20, 21, 22, 24:
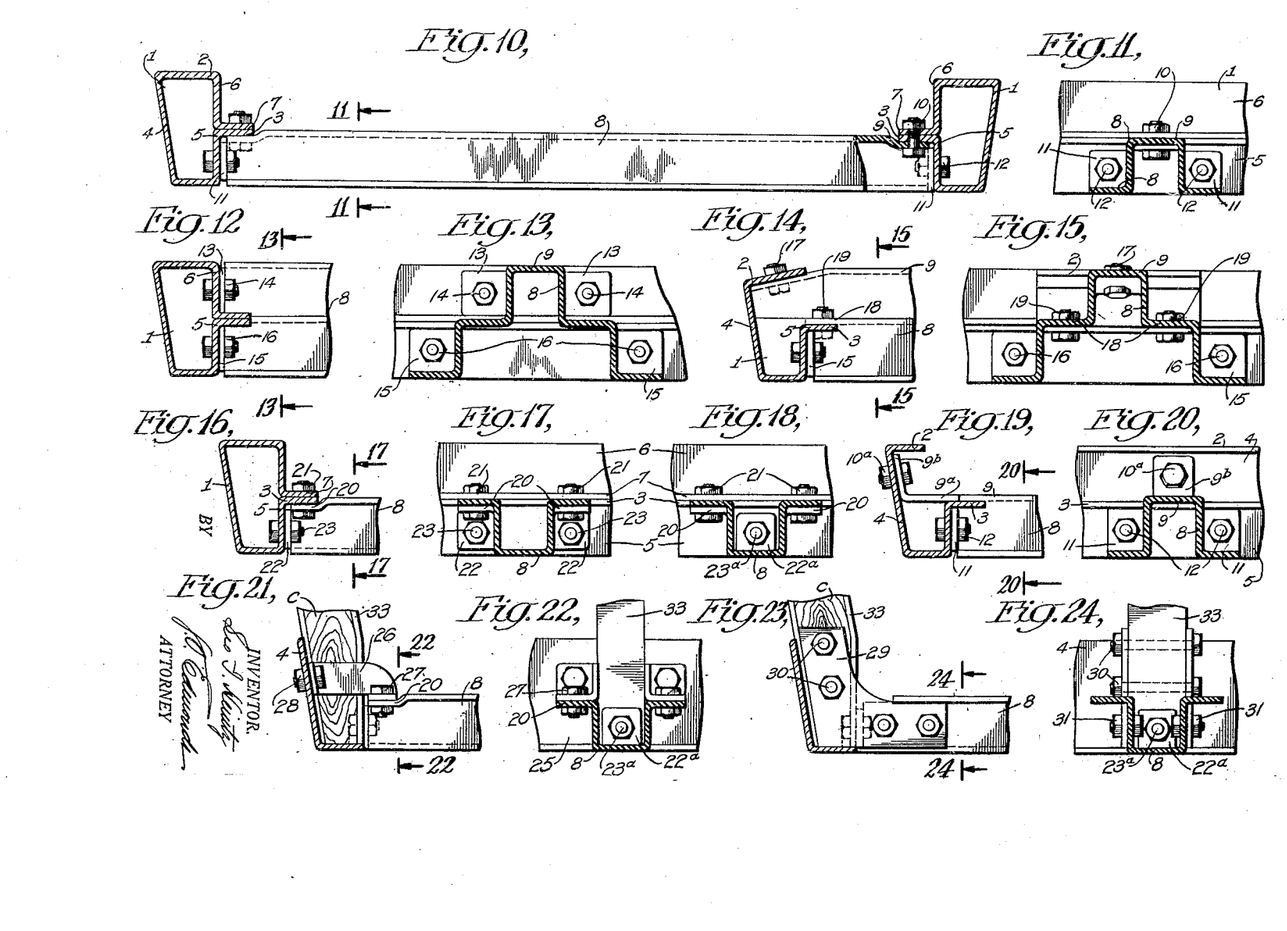
Figure 25:
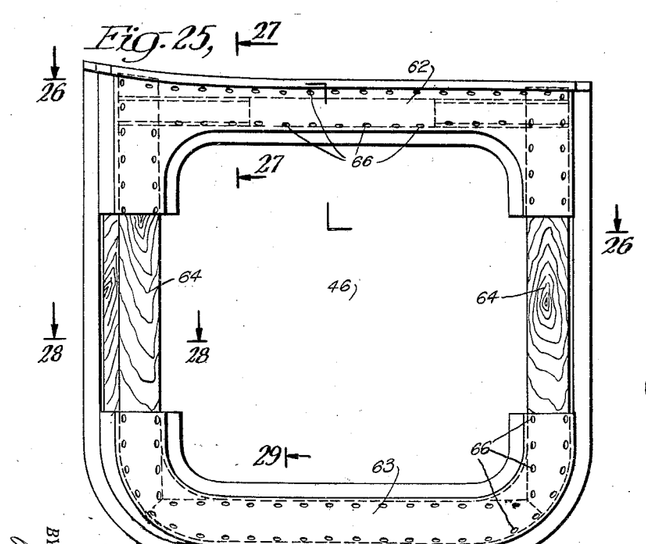
Fig. 25 is a side view of a modified form of door.
Figure 26:
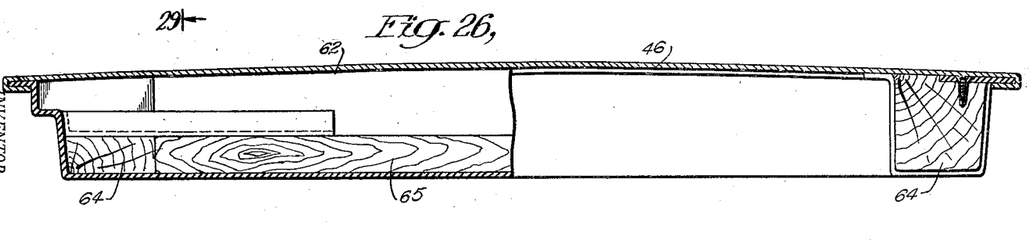
Fig. 26 is a horizontal sectional view taken on the line 26—26 of Fig. 25.
Figure 27:
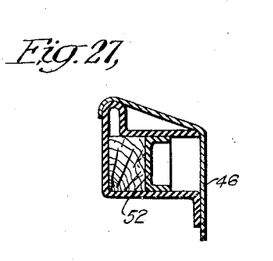
Figs. 27, 28 and 29 are sectional views of details of construction taken respectively on the lines 27—27, 28—28 and 29—29 of Fig. 25.
Figure 28:
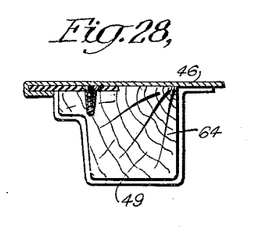
Figure 29:
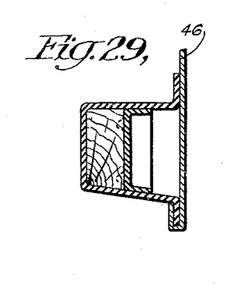

The body frame B primarily provides the two side sills 1 comprising sheet metal bent into channel form, with the open portion of the channel uppermost, and horizontal flanges 2, 3, extending respectively from the top of each of the side walls 4 and 5 of the channel, as shown in Figs. 14 and 19, except where the sill members 1 extend across a doorway, and at these places the upper flange 2 is extended inwardly and downwardly, as at 6, and then inwardly again, as at 7, to form a closed box girder as shown in Fig. 10. The body frame also includes suitable cross members 8 extending horizontally between the two sill members 1 at any chosen points. One of these cross members may connect the rear ends of the side sills 1, and may be of similar construction thereto. I preferably construct the cross members 8 of sheet metal, attaching the ends to the flanges 2 and 3 of the side sills 1 by means of bolts, although the attachment may be made by means of welding or otherwise, if desired. The cross members 8 are preferably channel shaped in cross section, and at their ends are preferably provided with vertical flange portions to permit of their being bolted to the inner side wall of the sill in addition to being bolted to the flange portions of the sill. In Figs. 10 and 11 I have illustrated a method of attaching a cross member substantially channel shaped in cross section to the side sills, where they pass under a doorway. As shown, the channel of the cross member opens downwardly. The top 9 of the cross member is bolted at its ends, as at 10, to the superimposed flanges 7 and 3 of the side sills, the ends of the cross member 8 being also provided with vertical flange portions 11 which are bolted, as at 12, to the inner wall portion 5 of the side sill 1. If a cross member similar in shape to the member just described is to be attached to the side sills at places other than at the doorways, I may use the method illustrated in Figs. 19 and 20. Here I attach the vertical flange portions 11 to the inner wall 5 of the sill 1 by means of bolts as before, but instead of bolting the top portion 9 to the flange 3 as formerly, I extend the same, as at $9^a$, to provide an upwardly extending flange $9^b$ which abuts against the inner surface of the wall 4 of the sill 1, and to which it may be bolted as at $10^a$.

If a stronger and sturdier cross member is desired, I may fashion the cross member so as to be substantially in the form illustrated in Figs. 13 and 15, and in this embodiment the top portion 9 of the cross member 8 may be disposed substantially at the same height with the top of the sill member 1. This cross member 8 is provided at its ends with four vertical flange portions, two of which, 13, are adapted to be bolted, as at 14, to the inner wall 6 of the sill 1, where it passes across a doorway, the two other flanges, 15, of the cross member 8 being bolted, as at 16, to the inner wall 5 of the sill. If this type of cross member is to be joined to a sill 1 where it does not cross a doorway, the lower vertical flanges 15 of the cross member 8 may be bolted, as at 16, (Figs. 14 and 15) to the inner wall 5 of the sill 1 as formerly, but the flanges 13 are omitted, and instead, the upper portion 9 is bolted, as at 17, to the flange 2 of the sill 1, and the intermediate horizontal flanges 18 of the cross member 8 are bolted, as at 19, to the flange 3 of the sill. If desired, the cross member 8 may be attached to the side sills in many other ways. As a further modification of this construction, I have shown a cross member U-shaped in cross section and attached to the side sill in Figs. 16, 17 and 18. As shown, the cross member is placed with the opening of the channel uppermost, and is provided with two oppositely disposed horizontal flanges 20 which are bolted, as at 21, to the flanges 7 and 3 of the side sill 1, where it crosses a doorway. In addition, the ends of the cross member may be provided either with a pair of vertical flanges 22 which are bolted, as at 23, to the inner wall 5 of the sill 1, and as shown in Fig. 17, or the end of the cross member may be provided with a single vertical flange $22^a$ which is bolted, as at $23^a$, to the inner wall 5 of the sill. The cross members may also be attached to the side sills where a post is present. If the cross member is of the shape last described, it may be provided as formerly with a vertical flange $22^a$ (Figs. 21 and 22), which is bolted, as at $23^a$, to the inner wall 33 of the post socket, and a further connection may be obtained by supplying a pair of separate brace members 26 attached at one end, as at 27, to the horizontal flanges 20 of the cross member 8, and at the other end, as at 28, to the outer wall 4 of the side sill 1. One member 26 is preferably positioned on each side of the post. Another method of accomplishing the connection between the side sill and post and a cross member may be accomplished by providing a pair of angle plates or brackets 29 (Figs. 23 and 24), and bolting them, as at 30, on opposite sides of the lower ends of a post. These bracket pieces 29 are shaped so as to extend alongside of vertical side portions of a U-shaped cross member to which they are respectively bolted, as at 31. The end of the bottom portion of the cross member 8 may be turned up to form the vertical flange $22^a$ which is bolted, as at $23^a$, to the inner wall 33 of the post socket as formerly.

It is obvious that cross members which are not channel shaped in cross section may be employed as well. For instance, they may be T-shaped or angle shaped in cross section. These cross members do not have to be tremendously strong. They need not be stronger than door posts. Morevoer, they need not be provided with the illustrated vertical flanges at their ends, nor be attached to the horizontal flanges of the body shell, unless so desired, since many other methods of attaching cross members to sills of this character may be devised.

Special attention is called to the fact that the upper horizontal flange 2 of the side sills provide threshold strips at the doorways, and also that the outer side 4 of the side sills serves as a body panel beneath the doorways. By this construction the necessity of using a number of separate pieces to form a finished threshold and body panel at the doorway is avoided, and as heretofore required in the construction of automobile bodies.

As above pointed out, it is my intention to associate wooden posts with the side sills, and to this end I provide socket members either integral with or attachable to the sills 1 and adapted to receive and firmly retain the wooden posts C. These socket pieces 31 may suitably be channel shaped in cross section. Preferably a socket 31 is placed at each side of a doorway with the open part of the channel extending toward the doorway. The outer side 32 of the socket 31 may be welded or otherwise secured to the inner surface of the outer wall 4 of the side sill, and the inner wall 33 of the socket piece may be provided with a horizontally extending flange 34 which is superimposed over the flange 3 of the side sill and is welded or bolted thereto. After the wooden posts C have been firmly seated in their sockets, they may be secured in place by means of one or more bolts 35 extending through the two sides of the socket and the post. The sockets may also be provided with suitably placed perforations, as at 36, for nails or screws by which panels or upholstery may be secured to the post C in spite of the presence of a socket piece.

A support 37 for a front seat may be provided either integrally joined to the side sills or otherwise attached thereto. A suitable seat support may be constructed easily and economically of sheet steel shaped to form a horizontal portion 38 and vertical portion 39 extending across the front edge of the seat support, and a horizontal flange 40 extending outwardly from the lower edge of the vertical portion 39. This seat support may be readily and firmly attached to the side sills by positioning the same with the flange 40 at the opposite sides of the seat support resting upon the superimposed flanges 7 and 3 of the side sill to which the flange 40 may be bolted or welded as desired. The back seat support 41 may suitably comprise a flat horizontal member 42, resting at its rear and side edges upon the flange 3 of the two side sills and rear cross member 8, to which the portion 42 may be secured by bolting or welding. A suitable heel-board may be provided by a sheet metal piece 43 extending across the front of member 42, and at its ends 44 laterally toward the front of the body. This piece is preferably provided with a flange 45 extending horizontally and resting on the flange 3 of the side sills to which it may be secured by bolting or welding. Preferably, the top edge of the piece 43 is also welded to the front edge of the member 42.

Having now provided the side sills, the cross members, posts, and the seat supports, the body may be completed by attaching suitable body panels, including side portions, seat backs and cowl to the structure. It is readily apparent that these may be attached to the wooden posts by means of screws and nails, although any other suitable method may be used, if desired. Thereafter, suitable upholstery may be attached in any one of a number of well known ways, although preferably the upholstery is attached directly to the inner surfaces of the wooden posts C or wooden cross members C' by means of screws or nails. The body may then be completed by applying doors thereto.

Figures 3, 4, 5, 6, 7, 8, 9:
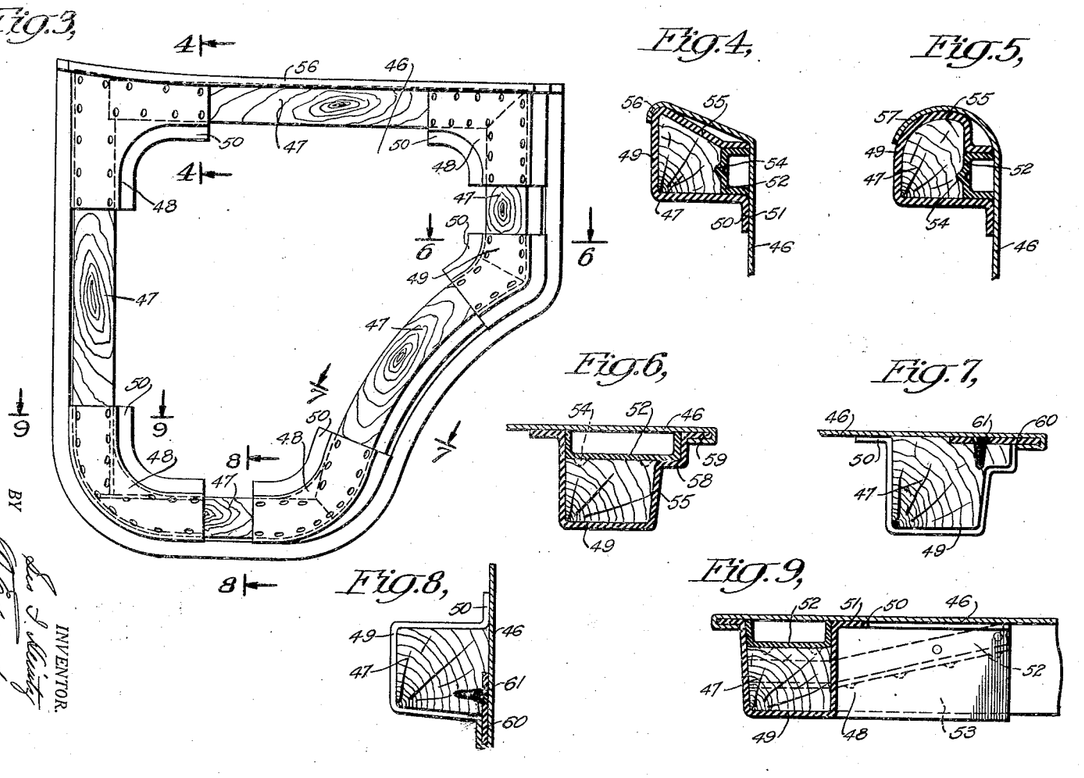
Fig. 3 is a side view of a door embodying my invention.
Fig. 4 is a sectional view of a detail of the construction of the door, and is taken on the line 4—4 of Fig. 3.
Fig. 5 is a view similar to the view shown in Fig. 4 showing a modified form of door construction.
Figs. 6, 7, 8 and 9 are views similar to that shown in Fig. 4, but are taken respectively on the lines 6—6, 7—7, 8—8 and 9—9 of Fig. 3.

A novel and improved form of door may be constructed by supporting an outer door panel 46 upon a frame constructed of wooden frame members 47 secured together by sheet metal corner boxes 48. Each corner box 48 is arranged to provide two tapered sockets to receive correspondingly tapered ends of adjacent frame members. As shown, the corner boxes 48 may be formed by providing a channel shaped member 49, preferably having an outwardly extending flange 50 to which the inner surface of the door panel 46 may be welded, as at 51. An auxiliary channel shaped member 52 may be provided interiorly of the channel member 49 to provide the tapered chamber 53 into which the end of a post is adapted to be wedged. The sides of the auxiliary channel member 52 preferably abuts the two sides of the channel member 49 and is secured thereto by welding. After a post has been seated in its socket, it may be firmly secured therein by punching barbs 54 into the wooden posts from the auxiliary member 52. Obviously, the shape of the corner boxes 48 may be varied considerably and the door panel 46 may be attached to these corner boxes in many different ways. For instance, as shown in Fig. 4, to form a straight tapered surface at the outer edge of the door, the channel piece 49 may have its outer edge bent inwardly, as at 55, and the edge of the door panel 46 may be extended over this portion 55 and welded to the corner box, as at 56. If desired, the portion 55 of member 49 may be curved and the edge of the door panel 46 may be likewise curved and welded thereto, as shown at 57 (see Fig. 5). In another modification (Fig. 6) the outer side 55 of the corner box may be stepped, as at 58, to conform with the door jamb. In this case the door panel 46 may be bent over and welded to a flange 59. If desired, the flange 59 may be omitted, and in place thereof a separate metal plate 60 (Figs. 7 and 8) may be secured to the wooden frame member, as by means of screws 61, and the door panel 46 may be bent over the edge of plate 60 and welded thereto.

As a modification of the above door construction, I may provide a post receiving member 62 extending across the entire top of the door and a complementary post receiving member 63 extending entirely across the bottom of the door. The vertical portions of the door frame are formed by a pair of wooden posts 64, the ends of which are seated respectively in sockets provided by the upper and lower members 62 and 63. The sockets are preferably formed by outer channel shaped members 49 and auxiliary channel shaped members 52 forming tapered chambers for the ends of the posts in accordance with the construction described above. The outer panel 46 of the door may be attached to the socket member 62 and 63 in the manner described above in connection with the attachment of the panel 46 to the corner boxes 48. Preferably the members 62 and 63 contain and enclose a wooden strip 65 and are perforated, as at 66, in order to permit of upholstery or of an interior door panel to be secured in place by means of screws or nails entering wood. It is readily apparent that the door hinges may be fastened to wood, not only on the door but also on the body proper. A door of either of the types above described will be noiseless in operation, will not require muffling to prevent production of a metallic sound upon being closed, and locks, hinges, etc., may be attached to woodwork without forfeiting the advantages obtained by the presence of strong steel corner boxes. The door can be made without the use of glue and is even stronger than a wooden door.

From the above description it will be readily apparent that the elements entering into the construction of the body may be produced separately and very economically in quantities. These units can readily be assembled later, requiring no additional finishing or machining. No glue enters into the manufacture or assembly of the above construction, while at the same time wood is employed where its use is more desirable for strength and noiselessness and other reasons than metal. By eliminating the use of glue entirely, one of the most troublesome and uncertain operations in the building of automobile bodies is avoided, and thereby considerable time is saved, since it avoids the necessity of waiting for glue to dry in proceeding with the manufacture and assembly of the body. The employment of the metal parts in the above disclosed construction also enhances uniformity in the location of the various members.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

A sill construction to some extent similar to the sill construction disclosed herein is disclosed and claimed in my copending application Serial No. 506,940, Automobile body frame, filed October 11, 1921.

What I claim is:—

1. In a frame for automobile bodies, in combination, two spaced, parallel, metal sill members, one at each side of said frame, cross-members extending between and attached to said sills, vertically disposed wooden posts, and means, comprising sockets integral with said sill members, for attaching said posts to said sill members.

2. In an automobile body, in combination, a frame comprising two spaced, parallel, metal sill members, one at each side of said frame, cross-members extending between and attached to said sills, vertically disposed wooden posts, and means, comprising sockets integral with said sill members, for attaching said posts to said sill members, and body panels secured to said sill members.

3. In an automobile body having a doorway on each side thereof, in combination, a pair of metal side sill members, each shaped to form a closed box beneath a doorway, the outer wall of each box constituting body panelling, the upper wall of each box constituting a threshold strip for a doorway, and the inner portion of each box having two superimposed horizontal flanges, and a cross member extending between said two sill members and secured to said flanges of each member.

4. In an automobile body frame, in combination, a metal side sill having an outer wall and an inner wall, and a metal cross member having vertical flanges abutting and secured to said walls.

5. In an automobile body frame, in combination, a metal side sill having an outer wall and an inner wall and flanges extending substantially horizontally from the top of said walls, and a cross member having substantially horizontal portions secured to said flanges.

6. In an automobile body frame, in combination, a metal side sill having an outer wall and an inner wall and flanges extending substantially horizontally from the top of said walls, a cross member having substantially horizontal portions secured to said flanges, and having a vertical flange abutting and secured to said inner wall.

7. In an automobile body, in combination, a metal side member shaped to form a closed box with two superimposed horizontal flanges, and a cross member secured to said flanges.

8. In an automobile body, in combination, a metal side member shaped to form a closed box with two superimposed horizontal flanges, a cross member having a horizontal portion secured to said flanges and having a vertical flange abutting and secured to an inner wall of said box.

9. In an automobile body, in combination, a metal side sill member shaped to form a closed box, the outer wall of said box comprising a body panel, the upper wall of said box comprising a threshold strip for a doorway, and the inner portion of said box having two superimposed horizontal flanges and a cross-member secured to said flanges.

10. In an automobile body frame, in combination, a metal side sill, a post socket supported on said sill, a wooden post supported in said socket, a cross-member, and means for connecting said member and sill together, said means comprising a vertical flange on said cross member bolted to an inner wall of said socket and a bracket member bolted to an outer wall of said side sill and to said cross member.

11. In an automobile body frame, in combination, a metal side sill, a post socket supported on said sill, a wooden post supported in said socket, a cross-member, and means for connecting said member and sill together, said means comprising a vertical flange on said cross member bolted to an inner wall of said socket and a bracket member bolted to said post and to said cross member.

12. In a door for automobile bodies, in combination, a metal corner member comprising a channel shaped member, and an auxiliary channel shaped member seated in the channel of said first member and forming therewith a tapered socket for a wooden post.

13. In a door for automobile bodies, in combination, a metal corner member comprising a channel shaped member, and an auxiliary channel shaped member seated in the channel of said first member and forming therewith a tapered socket for a wooden post, a wooden post seated in said socket, and means, comprising barbs struck from said auxiliary channel member into said post, for holding said post securely in said socket.

14. In a door for automobile bodies, in combination, wooden frame members secured together by metal socket members, outer flanges on said socket members, and an outer door panel marginally interlocking with and secured to said flanges.

15. In a door for automobile bodies, in combination, a door frame comprising a pair of spaced metal members and a pair of spaced wooden members extending between and secured to said metal members, an outer door panel secured to said metal members, wooden filling strips enclosed by said metal members, and perforations in said metal members exposing said wooden filling strips for the engagement of screws or nails.

This specification signed and witnessed this 17th day of April, 1922.

LEO I. HEINTZ.

Witnesses:
WALTER H. D'ARDENCY,
D. J. KENNEDY.